C. A. HERTENSTEIN & W. F. PROBST.
INDICATING DEVICE FOR CANS.
APPLICATION FILED SEPT. 30, 1911.

1,040,675.

Patented Oct. 8, 1912.

Inventors
Chauncey A. Hertenstein
William F. Probst

Witnesses

By
Attorney

UNITED STATES PATENT OFFICE.

CHAUNCEY A. HERTENSTEIN AND WILLIAM F. PROBST, OF CHILLICOTHE, OHIO.

INDICATING DEVICE FOR CANS.

1,040,675.     Specification of Letters Patent.     Patented Oct. 8, 1912.

Original application filed August 11, 1911, Serial No. 643,542. Divided and this application filed September 30, 1911. Serial No. 852,169.

*To all whom it may concern:*

Be it known that we, CHAUNCEY A. HERTENSTEIN and WILLIAM F. PROBST, citizens of the United States, residing at Chillicothe, in the county of Ross and State of Ohio, have invented certain new and useful Improvements in Indicating Devices for Cans, of which the following is a specification.

Our invention relates to an improvement in indicating devices for cans and is particularly designed for the purpose of providing a means of determining at a glance the depth of liquid contained in a can. It is adaptable to any type of can or tank and one form of its adaptation is shown in application Serial Number 643,542, filed August 11, 1911, of which this is a divisional application.

It is aimed in the effectuation of our present invention, to provide a type of indicator which is desirably visual in its nature. In this form, the indicator comprises an element capable of reciprocation through the jacket of the can or tank within which it is mounted, serving to indicate to the observer, by the length of the portion of the element displayed, the quantity of fluid contained within the can at any given moment. In conjunction with this indicator element, we desirably provide a graduated scale of some type and in the cans or tanks from which fluid is to be expelled by air pressure, this calibrated scale is preferably in the nature of a sealed element of transparent material marked with proper graduations.

An essential feature of our invention resides in the provision of such a structure that the movement of the indicating element hitherto mentioned, is limited and restricted to a comparatively small display; but the controlling mechaism for such indicator element is so connected thereto as to reduce the movement occasioned to the indicator in transmission from its operating device in a predetermined ratio.

The preferred embodiment of our invention is shown in the accompanying drawings, in which similar characters of reference designate corresponding parts, and in which—

Figure 1:
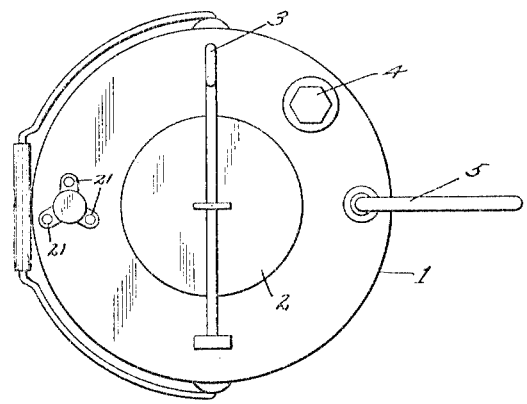
Figure 2:
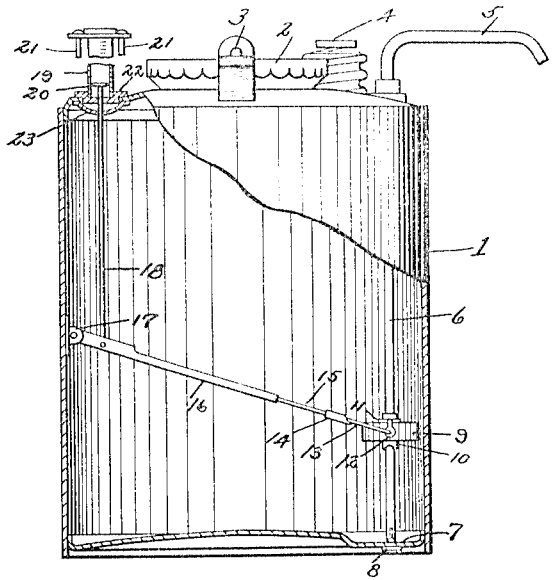

Figure 1 is a top plan view of a can with our indicator attachment applied thereto, and, Fig. 2 is a side elevation partly broken away and showing the application of our indicator to the interior of the can.

The can comprises a tank 1 having a bellows structure 2, operating lever 3, air releasing valve 4 and discharge pipe 5. In addition, the discharge pipe extends downwardly into the can as at 6 and terminates in a depression 7 formed in the bottom of the can and being the lowest point in such bottom. The lower end of the discharge pipe is desirably strengthened in its centered position by a pin 8. This structure is in accordance with the structure claimed in the divisional application above mentioned.

The indicator structure of our invention, desirably comprises a float 9 carried upon a concentric sleeve 10 and embraced by a yoke 11 extending across the upper surface thereof and embracing the sleeve 10, further being downwardly bent at its extremities to form perforated ears 12. These ears 12 serve as journals for the extremities of a bail 13 carrying an element 14. This element 14 serves as a rigid connection between the bail and a rod 15 loosely connected to and capable of a telescoping action upon or within a lever element 16 carried at its opposite extremity by a pivot bearing 17.

The indicator element is desirably in the form of a rod 18 pivotally mounted upon the rod 17 and extending vertically through the can and into a gage glass 19 where it is capped with a suitable pointer cap 20. This gage element 19 may be reinforced and supported in position by rods 21 and is desirably mounted in a cup 22 having in conjunction therewith an anti-splashing cup 23.

It will be understood that the float will be raised and lowered in accordance with the volume of fluid in the tank and that such raising or lowering of the float produces a visual indication of the quantity of fluid in the tank. Because of the telescoping action or collapsing action, the movement of the indicating element 18 is considerably less than the movement of the float. This telescoping action may of course be regulated and is, in fact, regulated by us in the effectuation of the full results of our invention. We are thus enabled to indicate the quantity of fluid in the tank regardless of its height therein, by a greatly reduced display of a visual indicator and a consequently great saving of space and elimination of objectionable projections such as would be occasioned by the mounting of an indicating rod directly upon a vertically movable float.

What we claim, is—

1. A dispensing can comprising a tank, an indicator movable through the jacket of said tank, a float, a guide for said float, and an automatically extensible lever pivotally supported at one end and connected to said float at its other end, said indicator being secured to said lever intermediate its ends.

2. A dispensing can comprising a tank, an indicator vertically movable into view from within said tank, a float, a guide for said float, and an automatically and longitudinally collapsing leverage mechanism secured to said indicator intermediate its ends, said leverage mechanism being pivotally supported at one end and connected to said float at its other end.

3. A dispensing can comprising a tank, an indicator vertically movable into view from within said tank, a float, a guide for said float, and an automatically and longitudinally telescoping lever connected to said indicator intermediate the ends of said lever, said lever having one end pivotally supported and its other end connected to said float.

4. A dispensing can comprising a tank, an indicator movable into view from within said tank, a discharge pipe extending from a point within said tank, a float slidable vertically on said pipe, and a longitudinally collapsing leverage mechanism secured intermediate its ends to said indicator and having one end pivotally supported and its other end secured to said float.

5. A dispensing can comprising an indicator, a float, a guide on which said float slides vertically and an intermediate collapsible lever between said float and said indicator and controlling said indicator.

In testimony whereof we affix our signatures in presence of two witnesses.

CHAUNCEY A. HERTENSTEIN.
WILLIAM F. PROBST.

Witnesses:
H. C. CLAYPOOL,
H. K. CLAYPOOL.